United States Patent [19]

Cimbal et al.

[11] Patent Number: 5,793,188
[45] Date of Patent: Aug. 11, 1998

[54] METHOD OF CONDITIONING ACCUMULATORS FIXEDLY MOUNTED IN AN APPARATUS AND A DEVICE THEREFOR

[75] Inventors: Jochen Cimbal, Friedberg; Manfred Kaiser, Karben, both of Germany

[73] Assignee: Braun Aktiengesellschaft, Frankfurt au Main, Germany

[21] Appl. No.: 704,578

[22] PCT Filed: Feb. 24, 1995

[86] PCT No.: PCT/EP95/00674

§ 371 Date: Sep. 10, 1996

§ 102(e) Date: Sep. 10, 1996

[87] PCT Pub. No.: WO95/26066

PCT Pub. Date: Sep. 28, 1995

[30] Foreign Application Priority Data

Mar. 22, 1994 [DE] Germany ............... 44 09 736.0

[51] Int. Cl.$^6$ ................................ H01M 10/46
[52] U.S. Cl. ................... 320/130; 320/DIG. 21; 320/132
[58] Field of Search ............... 320/2, 4, 5, 13, 320/21, 30, 31, 43, 48, 132, DIG. 21; 324/428

[56] References Cited

U.S. PATENT DOCUMENTS

| | | |
|---|---|---|
| 4,455,523 | 6/1984 | Koenck . |
| 4,703,247 | 10/1987 | Morioka ........................ 320/13 |
| 4,775,827 | 10/1988 | Ijntema et al. ................. 320/5 X |
| 4,835,453 | 5/1989 | Muning Schmidt et al. ...... 320/13 |
| 4,849,681 | 7/1989 | Munnig Schmidt et al. ...... 320/13 |
| 4,885,523 | 12/1989 | Koenck . |
| 4,931,737 | 6/1990 | Hishiki ..................... 324/428 X |

FOREIGN PATENT DOCUMENTS

| | | |
|---|---|---|
| 32 05 390 A1 | 11/1982 | Germany . |
| 33 40 882 C1 | 6/1985 | Germany . |
| 42 19 999 A1 | 12/1993 | Germany . |
| 2175759 | 12/1986 | United Kingdom . |

OTHER PUBLICATIONS

International Search Report dated May 30, 1995.

*Primary Examiner*—Edward Tso
*Attorney, Agent, or Firm*—Fish & Richardson P.C.

[57] ABSTRACT

The invention is directed to a method of conditioning accumulators in an apparatus operating in the line and the accumulator modes, in which an accumulator discharge/charge cycle is effected at cyclic intervals in which the accumulator is at least nearly completely discharged, wherein a count is made of the number of times the apparatus is used, wherein upon attainment of a predetermined frequency of use a cycle is started when the apparatus is connected to the line, in which cycle the accumulator is first completely discharged through a load and subsequently recharged, and wherein following this discharge/charge cycle a fresh count is made of the number of times the apparatus is used.

13 Claims, 3 Drawing Sheets

METHOD OF CONDITIONING ACCUMULATORS FIXEDLY MOUNTED IN AN APPARATUS AND A DEVICE THEREFOR

BACKGROUND OF THE INVENTION

This invention relates to a method of conditioning accumulators fixedly mounted in an apparatus.

A method of this type is already known from the operating instructions for the "Braun Micron S" electric shaver, date of print October 1986. The section captioned "Preserving the Cells" describes that the full capacity of the cells will be preserved if they are fully charged before the first shave and then completely discharged by shaving. Then they should be recharged to full capacity. This charging/discharging process should be repeated about twice a year. To be able to do this, the user of the shaving apparatus is required to remember at least roughly the time when such a discharge/charge cycle was performed last. On the basis of this, the user is then again required to calculate the time when the next discharge/charge cycle is due. Changing the cells is through the line by plugging an appliance plug into an outlet and suitably rectifying and transforming the line voltage.

Further, from the field of electrically powered toothbrushes it is known to provide a toothbrush holder with a connection to a power supply. In this arrangement, the accumulator of the toothbrush is charged by inductance when the toothbrush is inserted into its receptacle.

From DE 33 40 882 C1 it is known to discharge an accumulator via a resistor with a positive temperature coefficient for the purpose of conditioning the accumulator. In discharging the accumulator, the resistor is intended to ensure an accumulator temperature as uniform as possible, in that the power input of the resistor adapts to the temperature, while at the same time the resistor and the accumulator are connected to each other such that a heat exchange occurs. When the accumulator is discharged, a recharging cycle is to follow.

Still further, from DE 32 05 390 A1 and DE 42 19 999 A1 methods are known in which a a microprocessor is utilized for effecting a discharge of an accumulator prior to charging it.

SUMMARY OF THE INVENTION

It is an object of the present invention to facilitate the use of an accumulator-operated apparatus as much as possible while at the same time maximizing the useful life of the accumulator.

According to the present invention, this object is accomplished with the characterizing features of counting in a usage counter a number of times the apparatus is used, and upon attainment of a predetermined count and when the apparatus is connected to a power line, cycling the apparatus by discharging the accumulator through a load, subsequently recharging the accumulator, and resetting the usage counter. Advantageously, the discharge/charge cycles of the accumulator are executed only if the apparatus is connected to the line, so that the apparatus is not discharged when a subsequent charging operation is not possible. This means that the apparatus is connected to the line via the power plug, or the associated holder is connected to the line while the apparatus is inserted into the holder.

By contrast, the prior art referred to does not provide an indication of how the instant of time at which such an accumulator conditioning operation should be performed could be detected automatically.

With the feature of incrementing the usage counter on powering up the apparatus if a predetermined time period has elapsed since the last use it is advantageously prevented that an accidental turning on of the apparatus followed by turning off during a use are considered in the usage count.

The feature of aborting the discharging of the accumulator if during discharging the apparatus is disconnected from the power line or the apparatus is turned on is suitable to prevent complete draining of the accumulator when during an accumulator discharge cycle an unforeseen operating conditions occurs.

The arrangement wherein cycling the apparatus is not started until after a predetermined time period from a completed use of the apparatus has expired prevents the accumulator from being drained when the apparatus is disconnected from the line following use, so that a charging cycle following discharging would not be possible.

In an advantageous configuration wherein the usage counter is reset if the accumulator is discharged during operation of the apparatus, depleted accumulator conditions as they occur during normal operation are considered in this method of accumulator conditioning, that is, the discharge/charge cycle of the present invention is not executed unnecessarily often.

In a further advantageous feature, this accumulator discharge/charge cycle is indicated to the user by a display means. This is of advantage particularly in such apparatus in which the current charging condition of the accumulator is indicated on a display. This display is then driven normally during the discharging and the subsequent charging cycle, enabling the user to identify the discharge/charge cycle as such because of the variation in display.

In a particularly advantageous embodiment, an additional symbol provided on the display means may explicitly signal to the user that this discharge/charge cycle is being executed. The symbol of a crossed-out power plug, for example, would be an obvious choice. This warns the user against pulling the power plug during the discharge and subsequent charge cycles, thus enabling the apparatus to be charged safely.

The feature of incrementing the usage counter only when a minimum time lapse has occurred since a previous use ensures that the discharge/charge cycle is effected only if the cycle can be completed between two uses.

By incrementing the usage counter for multiple uses only if the minimum time lapse has occurred between the previous use and each of the multiple uses, it is ensured that the cycle is effected only if the time intervals between uses were consistently of sufficiently long duration.

The feature of wherein cycling the apparatus is not effected until in several previous uses the minimum time lapse has occurred since each of said previous uses ensures that the cycle is effected only if the time intervals between uses in a past time span were consistently of sufficiently long duration.

An embodiment of the present invention will be described in the following with reference to the accompanying drawings. In the drawings,

DESCRIPTION OF THE PREFERRED EMBODIMENT

Figure 1:
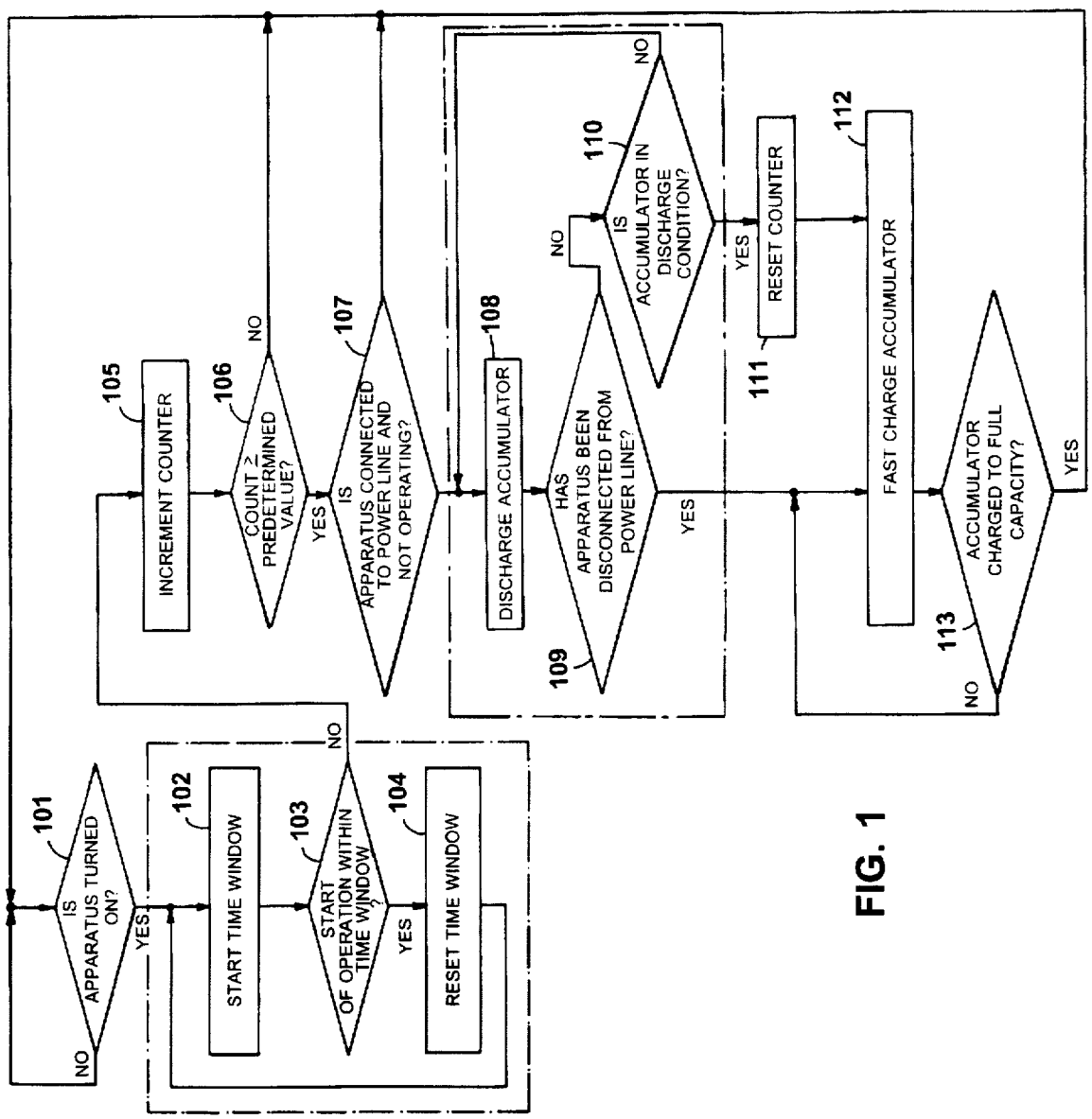
FIG. 1 is a flow diagram for illustrating the method of the invention.

In a configuration of an embodiment of FIG. 1, a determination is made at a stage 101 as to whether the apparatus is in starting condition, that is, whether the apparatus is turned on. In the present embodiment, the apparatus is an electric shaver.

If the answer is yes, the routine proceeds to stage 102 where a time window is started. Then a check is made at stage 103 to determine whether a fresh start of operation has occurred within this particular time window. If it is determined that a fresh start of operation has occurred before the expiration of this time window, it can be assumed, for example, that the apparatus has been turned on and off accidentally during a shave, so that this does not enter the usage count as a separate shave. Accordingly, if a fresh start of operation is detected at stage 103 before the time window has expired, the time window is reset at stage 104, that is, a fresh measurement begins of the time duration from which it is concluded that a new shaving operation is involved. The routine returns to stage 102. This time window may be of the order of magnitude of 10 minutes, approximately.

If no fresh start of operation is detected within this time window, the routine proceeds to stage 105. At stage 105, a counter is incremented which records the individual shaving operations, that is, the number of times the shaver is used. At the same time, the time window is reset at stage 105. At stage 106, a test is then made to determine whether the count is greater than or equal to a predetermined maximum value, that is, whether the number of uses has reached a predetermined frequency. This maximum value is selected such that discharging and subsequent charging of the accumulator are effected at intervals of some months. Assuming that the user of a shaving apparatus shaves once a day and that the charge/discharge cycle should be effected at about six-month intervals, this counter maximum value could be of the order of magnitude of 180, for example. If the counter reading is lower than the predetermined maximum value, the routine cycles back to stage 101. When the counter reading is equal to the maximum value, the routine proceeds to stage 107.

At this stage, following the expiration of a specified time period, a determination is made as to whether the accumulator should be discharged and subsequently recharged. This expiration of a specified time period serves to prevent the conditions for the discharge/charge cycle from being satisfied immediately after a shave, that is, the shaver is connected to the line, but is disconnected from the line after a relatively short period because, for example, the user goes on a trip. In this event, a discharge/charge cycle is prevented from being initiated by allowing the specified time period to expire which may be of the order of magnitude of between 30 and 60 minutes.

Upon expiration of this time period, a check is thus made at stage 107 to establish whether the apparatus continues to be connected to the line. Advantageously, this check may also include an additional test to determine whether the line voltage is above a threshold value of 100 volts, for example. Advantageously, the discharge/charge cycle is thereby prevented from occurring in cases where, for example, the apparatus is connected to a 12-volt DC source of a car, boat or mobile home where the charging operation would take a comparatively long time.

Still further, a test is made at stage 107 to establish whether the apparatus is not operating. In addition, it may be tested at stage 107 whether the accumulator is charged to full capacity. This may be accomplished, for example, by detecting the transition from the "charge" condition to the "maintenance charge" condition. This latter test is useful in particular if the check made at stage 110—as indicated below—involves a determination as to whether the predetermined time period has expired. If the accumulator is then only discharged from the "full charge" condition, it is ensured that a defined discharge condition prevails upon termination of the discharge cycle.

If any one of the checks made at stage 107 produces the answer no, the routine returns to stage 101.

If the apparatus is connected to the line, the accumulator is discharged at stage 108. This is accomplished by the connection of a resistor to the accumulator, this resistor then discharging the accumulator. As this stage 108 proceeds, checks are simultaneously made at stage 109 to determine whether the connection to the line is interrupted. If the answer is yes, the discharge/charge cycle is aborted, the routine proceeds to stage 112, and the accumulator is recharged as soon as the connection to the line is re-established. The charge/discharge cycle is equally aborted upon the test at stage 109 if the user turns the apparatus on while the accumulator is being discharged. At the same time, it is tested at stage 110 whether the accumulator is in discharged condition. This may be accomplished, for example, by connecting the resistor to the accumulator for a predetermined period of time. The discharge condition of the accumulator is detected when the predetermined time period has elapsed. A selected period of time for discharging the accumulator of a shaving apparatus may be of the order of magnitude of six hours, for example. However, it is also conceivable to monitor the charge condition of the accumulator during the discharge cycle and to determine the corresponding charge or discharge condition of the accumulator in accordance with predetermined conditions, as by measuring the terminal voltage of the accumulator.

As soon as the accumulator is discharged, that is, depleted, the counter is reset at stage 111.

This is followed by a fast charge of the accumulator at stage 112. As this occurs, a determination is made at stage 113 as to whether the accumulator is recharged to full capacity. If it is not, fast charging continues at stage 112.

By contrast, when a fully charged condition is established, the routine returns to stage 101. In this case, accordingly, the time window is set to zero, and the counter is set to zero, that is to say that with a fresh start of operation the procedure restarts from stage 101. In shaving apparatus, the period of time required for a fast charge is of the order of magnitude of one hour. Assuming a time lapse of the order of magnitude of 30 to 60 minutes before a test is made at stage 107 to establish whether the apparatus is still connected to the line, there results in total a wait time plus discharge time plus charge time of the order of magnitude of between seven and eight hours.

Figure 2:
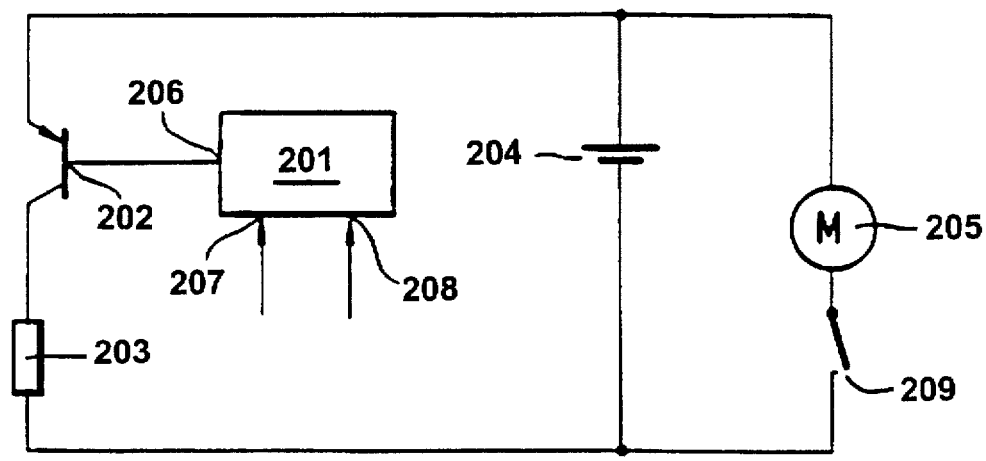
FIG. 2 is a representation of the components required for implementation of the method of the invention.

FIG. 2 shows an embodiment of the components necessary for implementing the method of the present invention. In this embodiment, a microprocessor 201 is provided with two inputs 207 and 208.

Via input 208, a signal is delivered to the microprocessor which is indicative of the start of operation, that is, of a power-up condition of the apparatus.

Via input 207, the microprocessor receives a signal indicating whether or not the apparatus is connected to the line.

When the DC voltage is obtained from a rectified AC voltage by means of a flyback converter, the primary side of the flyback converter, for example, may have a resistor connected to the terminals of the voltage source upstream or downstream of the rectification of the AC voltage. In the event of a voltage drop across this resistor, the apparatus is connected to the line.

In dependence upon these input signals and the time window established in the microprocessor, the counter, the predetermined maximum value of the counter reading, and the process stages of FIG. 1, an output signal is generated in the microprocessor which is delivered via output 206. This output signal 206 drives a controllable switching device 202 which may be a transistor. Via this controllable switching device, a resistor 203 may be connected to the terminals of an accumulator 204, discharging this accumulator. As becomes further apparent from FIG. 2, a motor 205 may be connected to the accumulator via a switch 209 actuatable by the user.

Figure 3:
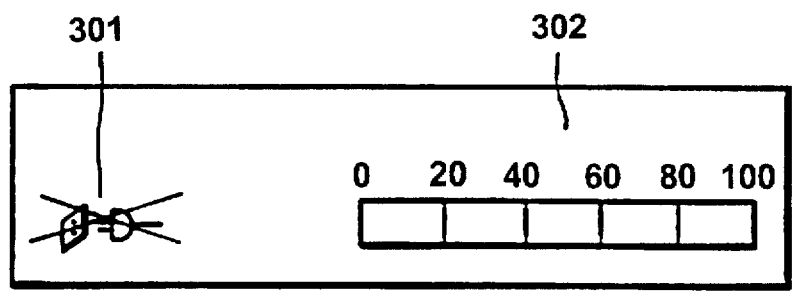
FIG. 3 is a view of a display means indicating to the user the start of an accumulator discharge/charge cycle.

FIG. 3 shows a display means enabling the user to recognize the start of an accumulator discharge/charge cycle. In section 302, display segments are driven indicating the charge status of the accumulator in percent. To prevent the user from becoming confused by the variation in the percent display of the accumulator charge during the discharge/charge cycle (the user seeing well that the apparatus is turned off, and yet he notices a variation of the charge status of the accumulator), a further symbol 301 is provided indicating to the user that such a discharge/charge cycle has started. In the representation of FIG. 3, this symbol is conveniently selected such as to warn the user against pulling the power plug as long as this condition lasts.

Figure 4:
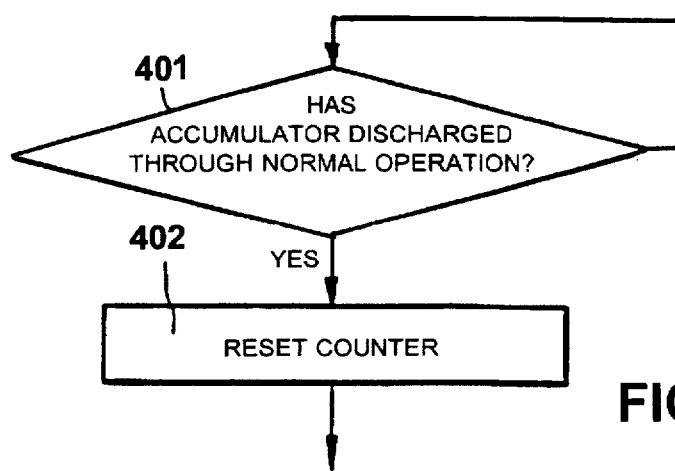
FIG. 4 is a block diagram for illustrating the sequence of operations as they occur when the accumulator is discharged during operation.

FIG. 4 illustrates schematically that it is not necessary to execute the discharge/charge cycle when the accumulator of the apparatus is discharged through normal operation. According to the invention, this is accomplished by an intervention in the sequence of operations of FIG. 1, such that the counter is reset. This means that when the accumulator is discharged through normal operation, this condition is treated in the process sequence of the invention as shown in FIG. 1 as if the discharge/charge cycle had been executed by reason of the expiration of time according to stages 105 and 106 of FIG. 1 or according to FIG. 5.

Figure 5:
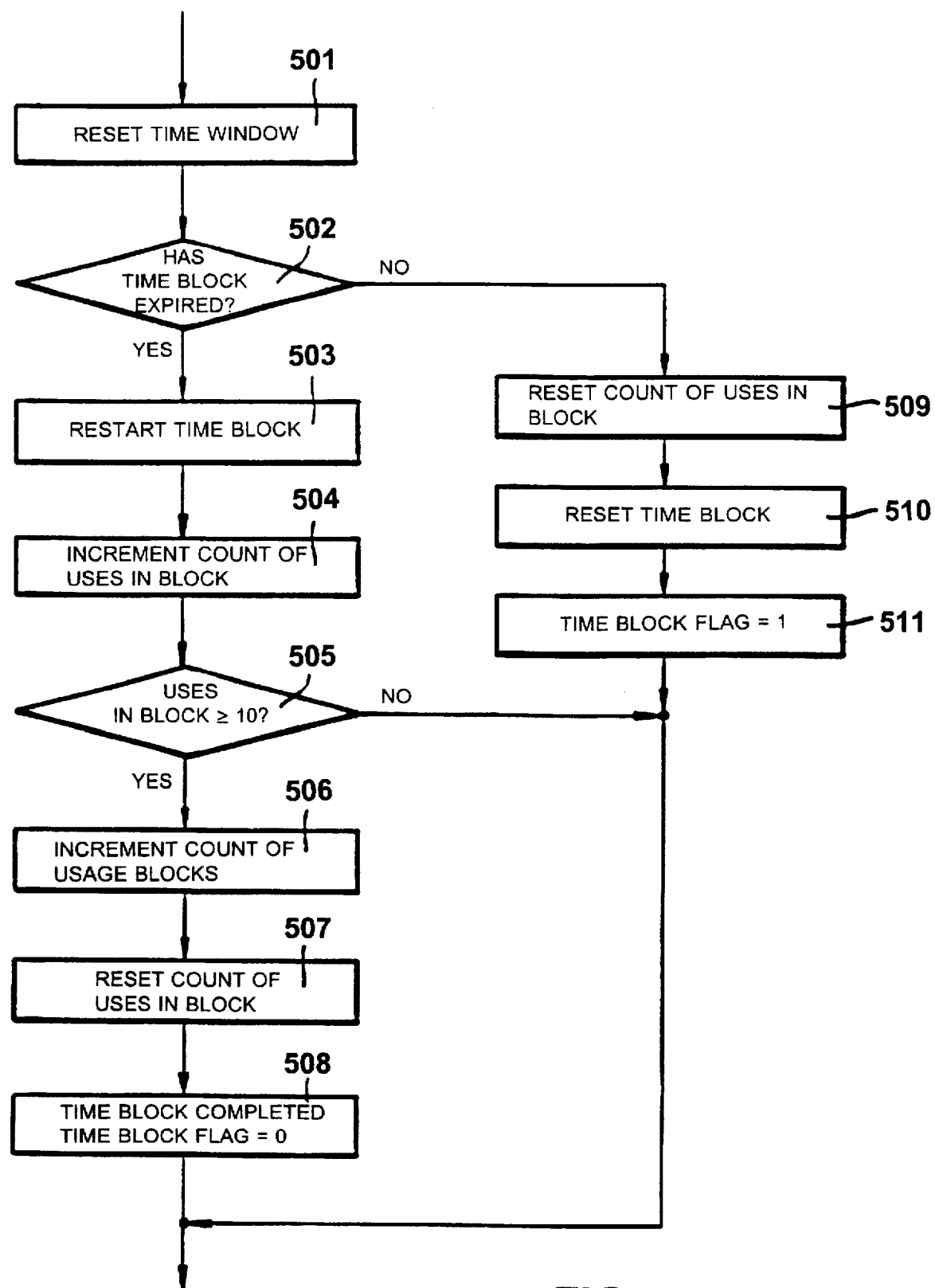
FIG. 5 is a section of the flow diagram illustrating a variation thereof.

With the process stages of FIG. 5, it is advantageously ensured that a discharge/charge cycle is executed only if there is a time lapse between individual uses of the apparatus, such that the duration of the discharge/charge cycle is shorter than the time lapse between uses. This is to prevent a discharge/charge cycle from being started when it appears that the user may use the apparatus again while the discharge/charge cycle still lasts. In the embodiment of the process stages of FIG. 5, the individual usages are combined in blocks. Advantageously, ten usages are combined to form one block. These usage blocks are added up to obtain the duration of usages. These blocks of individual usages which may be of the order of magnitude of ten per block are considered in the total usage count only if between successive usages in a block the corresponding minimum time period has expired as lapse between uses. This means that usages are counted only if between several usages the corresponding minimum time lapse has occurred, that is, a period of time greater than the duration of the discharge/charge cycle, has elapsed. In this process, the process stages of FIG. 5 replace stage 105 of FIG. 1.

At stage 501, the time window is reset which was started at stage 102. At stage 502 a check is then made to determine whether the required minimum time lapse has occurred since the last use. This is accomplished in that it is tested whether a started time block has meanwhile expired, or whether the usage determined at this particular moment has taken place within the time block. This time block is suitably dimensioned such that it is of an order of magnitude corresponding to the duration of the discharge/charge cycle.

It is determined at stage 502 that the required minimum time period since the last use has elapsed, that is, that the time block has expired, a reset occurs at stage 503, followed by a restart of the time block. At stage 504, the processor increments a first counter which records the number of uses in a block, that is, the number of uses between which the required minimum time lapse must have occurred to enable this block, and accordingly this particular number of uses, to be considered in the usage count. The number of cumulative uses in this block may be of the order of magnitude of about 10. At stage 505, a check is then made to determine whether this first counter has reached its predetermined maximum value. As set forth in the foregoing, it is thus checked whether this first counter has reached the value 10. If the answer is yes, the processor increments a second counter. This second counter performs a count of the usage blocks that have been completed successfully, that is, the blocks in which the required minimum time lapse between individual uses has occurred. This is effected at stage 506 following which the routine proceeds to stage 507 in which counter 1, that is, the first counter that records the individual uses in a block, is reset. At stage 508, a time block flag is set to zero value. This time block flag indicates that a time block has been completed successfully, meeting the requirement for the minimum time lapse between individual uses in a block. If it is established at stage 505 that counter 1 has not reached its maximum value as yet, the routine proceeds directly to stage 106 of the process of FIG. 1. Equally, the routine proceeds from stage 508 to stage 106 of FIG. 1. If it is established at stage 502 that the time block has not yet expired since the last use, counter 1 is reset at stage 509, that is, all uses so far counted in this block are cancelled as a result of this detected fault condition. A fault condition is detected because the required minimum time lapse between two uses has not occurred. At stage 510, a reset is made, followed by a restart of the time block. The time block flag is set to 1 at stage 511. This signals that a fault condition has occurred in counting the number of uses in a block, that is, the required minimum time period between uses has not elapsed. Subsequent to stage 511, the routine proceeds equally to stage 106 of FIG. 1. Where stage 105 of FIG. 1 is replaced by the process stages of FIG. 5, a determination is made at stage 106 as to whether counter 2 has reached its maximum value. Since this counter 2 records blocks of usages, the maximum value of counter 2 may be of the order of magnitude of between 15 and 20, in accordance with the given number of uses in the blocks. Correspondingly, this counter 2 is reset at stage 111.

Advantageously, an additional check may be made at stage 107 to determine whether the time block flag has zero value. This is the case only if the count of the last block of individual usages has been completed successfully, that is, that in the last period between individual uses the required minimum time lapse has always occurred.

We claim:

1. A method for conditioning an accumulator fixedly mounted in an apparatus comprising:

counting in a usage counter a number of times the apparatus is used; and upon attainment of a predetermined count and when the apparatus is connected to a power line, cycling the apparatus by discharging the accumulator through a load, subsequently recharging the accumulator, and resetting the usage counter.

2. The method as claimed in claim 1, wherein counting includes incrementing the usage counter on powering up the apparatus if a predetermined time period has elapsed since the last use.

3. The method as claimed in claim 1, wherein cycling the apparatus further includes aborting the discharging of the accumulator if during discharging the apparatus is disconnected from the power line or the apparatus is turned on.

4. The method as claimed in claim 1, wherein cycling the apparatus is not started until after a predetermined time period from a completed use of the apparatus has expired.

5. The method as claimed in claim 1, further comprising resetting the usage counter if the accumulator is discharged during operation of the apparatus.

6. The method as claimed in claim 1, further comprising indicating to the user the cycling of the apparatus.

7. The method as claimed in claim 6, wherein indicating the cycling includes providing a symbol warning the user against disconnecting the power line.

8. The method as claimed in claim 1, wherein counting includes incrementing the usage counter only on those uses where when a minimum time lapse has occurred since a previous use.

9. The method as claimed in claim 8, wherein counting further includes incrementing the usage counter for a plurality of uses only if the minimum time lapse has occurred between the previous use and each of the plurality of uses.

10. The method as claimed in claim 9, wherein cycling the apparatus is not effected until in several previous uses the minimum time lapse has occurred since each of said previous uses.

11. A device for conditioning an accumulator in an apparatus, said device comprising:

a load adapted to be connected to the terminals of the accumulator;

a counter;

a switching device;

a processor programmed to perform the functions of
  (a) determining whether a start of operation of the apparatus has occurred,
  (b) determining whether the apparatus is connected to a power line,
  (c) recording in the counter a number of uses of the apparatus,
  (d) testing whether the counter exceeds a predetermined maximum value, and
  (e) causing the switching device to connect the load to the accumulator if the counter exceeds the predetermined maximum value.

12. The device as claimed in claim 11, wherein the apparatus is one from the group consisting of a shaver, a beard trimmer, and a hair cutting apparatus.

13. The device as claimed in claim 11, wherein the switching device is a transistor.

* * * * *